Dec. 3, 1968

C. B. TRIMBLE

3,414,717

INFORMATION SENSING STATION

Original Filed March 14, 1960

INVENTOR
CEBERN B. TRIMBLE

BY *Louis A. Kline*
*Albert L. Sessler, Jr.*

HIS ATTORNEYS

# United States Patent Office 3,414,717
Patented Dec. 3, 1968

3,414,717
INFORMATION SENSING STATION
Cebern B. Trimble, Dayton, Ohio, assignor to The National Cash Register Company, Dayton, Ohio, a corporation of Maryland
Original application Mar. 14, 1960, Ser. No. 14,888, now Patent No. 3,158,305, dated Nov. 24, 1964. Divided and this application Oct. 12, 1964, Ser. No. 402,998
2 Claims. (Cl. 235—61.11)

ABSTRACT OF THE DISCLOSURE

An information sensing station for high-speed record-media-handling apparatus. A source of radiation, a slot in the station, an a plurality of radiation-sensitive elements for sensing information from the record media are arranged in a plane perpendicular to the path of travel of the record media through the information sensing station. The radiation-sensitive elements are positioned with their longitudinal axes in said plane, and their sensing portions located along a circular arc having its center at the source of radiation. The sensing portions of the radiation-sensitive elements project into an opening which communicates with the slot in the information sensing station.

---

Cross-reference to related application

This application is a division of copending U.S. application Ser. No. 14,888, filed Mar. 14, 1960, now U.S. Patent No. 3,158,305, granted Nov. 24, 1964.

The present invention relates generally to high-speed record-media-handling apparatus, and more particularly to a novel information sensing station for such apparatus.

The present invention may be utilized in association with a number of different types of record media, but for illustrative purposes it will be described primarily as an information sensing station for use in connection with perforated tape. It will be recognized, however, that other types of record members, such as punched cards, could be sensed by the present invention.

It is an object of the present invention to provide a novel information sensing station for record-media-handling apparatus.

A further object is to provide an information sensing station comprising an optical slot and a plurality of photosensitive members spaced from such slot and arranged to receive radiation through perforations in a record member and through said slot.

With these and incidental objects in view, the invention includes certain novel features of construction and combinations of parts, a preferred form or embodiment of which is hereinafter described with reference to the drawing which accompanies and forms a part of this specification.

Figure 1:
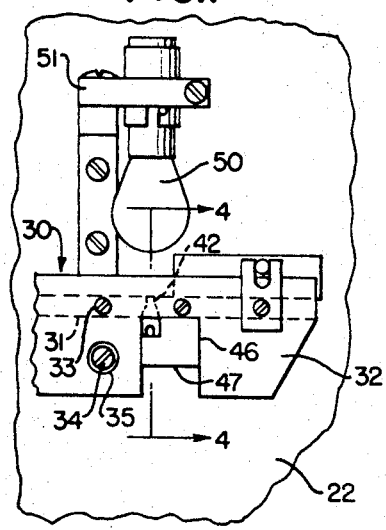
FIG. 1 is a partial side elevation of the tape-handling apparatus, showing the manner in which the information sensing station is incorporated in said device.
Figure 2:
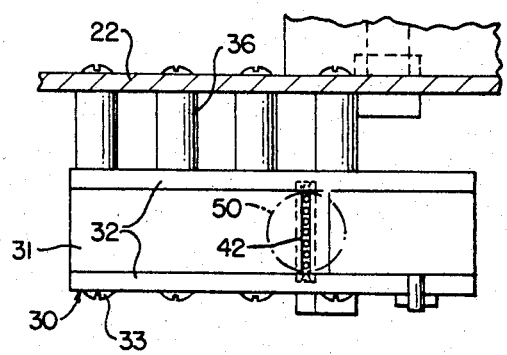
FIG. 2 is a partial plan view showing the tape-handling apparatus and the associated information sensing station.

For a complete description and showing of the tape-handling device partially shown in the figures of the drawing, reference may be had to the previously-mentioned U.S. application Ser. No. 14,888, of which the present application is a division. As shown in FIGS. 1 and 2, a tape guide 30 is fixed to a frame 22 of the tape-handling device. This guide comprises a table 31 and a pair of side-walls 32. The tape rides on the table 31 and is prevented from transverse movement by the side-walls 32. The side-walls 32 are secured to the table 31 by means of machine screws 33, and the entire assembly is secured to the frame 22 by means of machine screws 34, which connect the inner wall 32 to the frame 22 through spacers 3. Apertures 35 are provided in the outer side-wall 32 in order to provide ready access to the heads of the machine screws 34.

Figure 3:
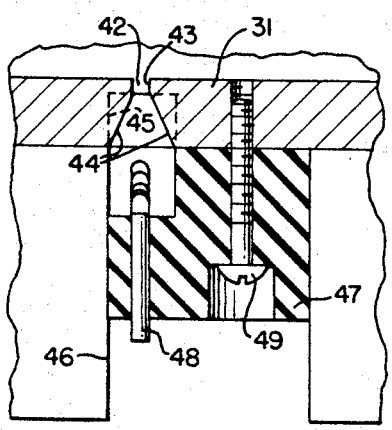
FIG. 3 is an enlarged sectional view of the optical slot portion of the information sensing station, taken on line 3—3 of FIG. 4.
Figure 4:
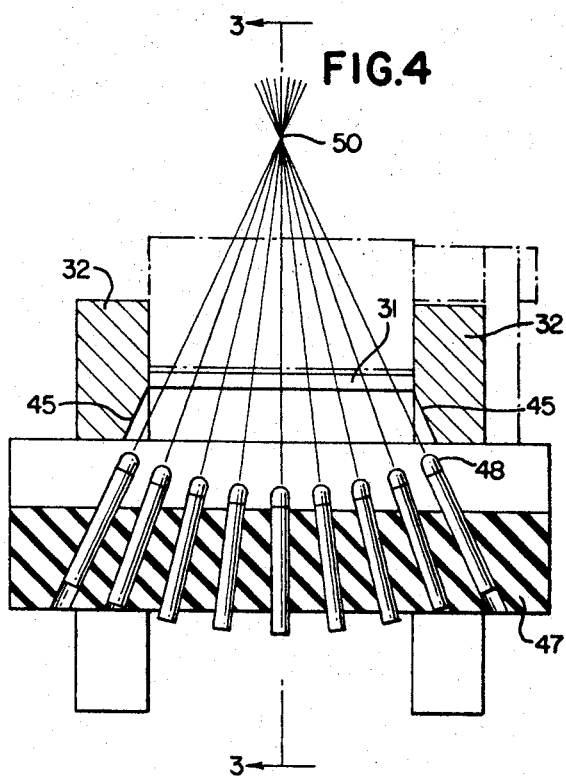
FIG. 4 is an enlarged sectional view of the optical slot portion of the information sensing station, taken on line 4—4 of FIG. 1.

Intermediate the ends of the tape guide 30 is situated an information sensing station. A slot 42 extends transversely of the table 31 and divides said table into two separate portions. The slot 42, as best shown in FIG. 3, is defined by short vertical wall portions 43 and longer tapering diverging wall portions 44, which provide a slot that is wider at its lower end than at its upper end. In order to increase the transverse width of the slot 42 at its base, the side-walls 32 are angularly cut away as shown in FIGS. 3 and 4 by reference character 45.

Below the slot 42, a rectangular cutout 46 is provided in each of the side-walls 32, in order to receive a block 47 of suitable insulating material, in which are located a plurality of photodiodes 48. The block 47 is secured to the under side of the table 31 by means of machine screws 49 or other suitable fastening means. As shown in FIG. 3, the photodiodes 48 are positioned in the block 47 in a vertical plane which extends through the slot 42, and, as may be seen in FIG. 4, the photodiodes 48 are arranged with their upper operative ends along an arc, the center of which is located at a light source 50, which is mounted by means of a bracket 51 on the frame 22. The longitudinal axes of the various photodiodes 48 extend radially outward from a center point at the light source 50. The photodiodes 48 are so spaced in their location in the block 47 that the radii which pass through the longitudinal axes of the various photodiodes also pass through centers of the various channels on the tape 20, so that when a perforation is present in any one of the channels of the tape, the light rays passing through it from the light source 50 will impinge directly upon the corresponding photodiode 48.

It will be seen that an extremely simple structure has been provided for the sensing station. The structure of FIGS. 3 and 4 is easy to manufacture and does not require any complex, expensive lens or mirror optical arrangements to accomplish the sensing function. Also, the open slot construction is well suited for removal of chaff and other foreign matter which may be carried by the tape into the sensing station. Since there is a relatively large volume in which such material may collect, and since the photodiodes 48 are spaced a considerable distance from the tape-guiding surface, an accumulation of foreign material is not likely to become lodged between the photodiodes and the tape-guiding surface to interfere with sensing of the tape.

Furthermore, due to the arrangement in which the photodiodes 48 are spaced a considerable distance from the tape-guiding surface, and due to the fact that each of these photodiodes has a relatively small radiation-sensing surface, the present sensing means is better adapted to discriminate between code perforations on the tape and paper faults (small translucent areas which sometimes are present on tape of this type) than are more conventional sensing systems. This is due to the fact that paper faults, which permit some radiation from the source 50 to pass through the tape, act to diffuse the radiation. On the other hand, radiation passing through a code perforation in the tape is not appreciably diffused. Since the photodiodes 48 are spaced a considerable distance from the tape, diffusion of radiation through a paper fault is effective to reduce greatly the amount of radiation impinging upon any one photodiode 48, in comparison with the direct radiation on such a diode resulting from a code perforation in the tape. As a result, discrimination by the photodiodes 48 between spurious signals and genuine signals is much more accurate than with more conventional sensing systems.

While the form of the invention shown and described herein is admirably adapted to fulfill the objects primarily stated, it is to be understood that it is not intended to confine the invention to the form or embodiment disclosed herein, for the invention is susceptible of embodiment in various other forms.

What is claimed is:

1. In a record-media-handling apparatus, an information sensing station comprising, in combination, a guide for supporting record media for movement past the sensing station, said guide being formed to define a slot having symmetrically diverging walls; a source of radiation; means for supporting said source of radiation in a plane extending through said slot and perpendicular to the guide; a plurality of radiation-sensing elements for sensing information carried by the record media; and means for supporting said elements so that they are positioned with their longitudinal axes in said plane, said elements being located with their sensing portions along a circular arc, the center of which is located at said source of radiation, and with their longitudinal axes extending radially outward from said center.

2. In a record-media-handling apparatus, the information sensing station of claim 1, in which said means for supporting said elements is shaped to define an opening into which the sensing portions of said elements project, said opening being contiguous to the slot in said guide to provide a space in which foreign matter associated with the record media may collect without clogging the slot to interfere with the sensing of the record media.

References Cited

UNITED STATES PATENTS

| | | |
|---|---|---|
| 1,675,894 | 7/1928 | Lindridge. |
| 2,620,978 | 12/1952 | Carroll et al. _____ 235—61.11 |
| 2,916,624 | 12/1959 | Angel et al. _____ 250—219 |
| 3,142,749 | 7/1964 | Larsen _____ 235—61.11 |

DARYL W. COOK, *Primary Examiner.*

UNITED STATES PATENT OFFICE
CERTIFICATE OF CORRECTION

Patent No. 3,414,717                     December 3, 1968

Cebern B. Trimble

It is certified that error appears in the above identified patent and that said Letters Patent are hereby corrected as shown below:

Column 2, line 9, "3" should read -- 36 --.

Signed and sealed this 10th day of March 1970.

(SEAL)
Attest:

Edward M. Fletcher, Jr.             WILLIAM E. SCHUYLER, JR.
Attesting Officer                      Commissioner of Patents